Jan. 4, 1938.  R. C. ALLEN  2,104,502
VALVE
Filed Sept. 24, 1936  2 Sheets-Sheet 1
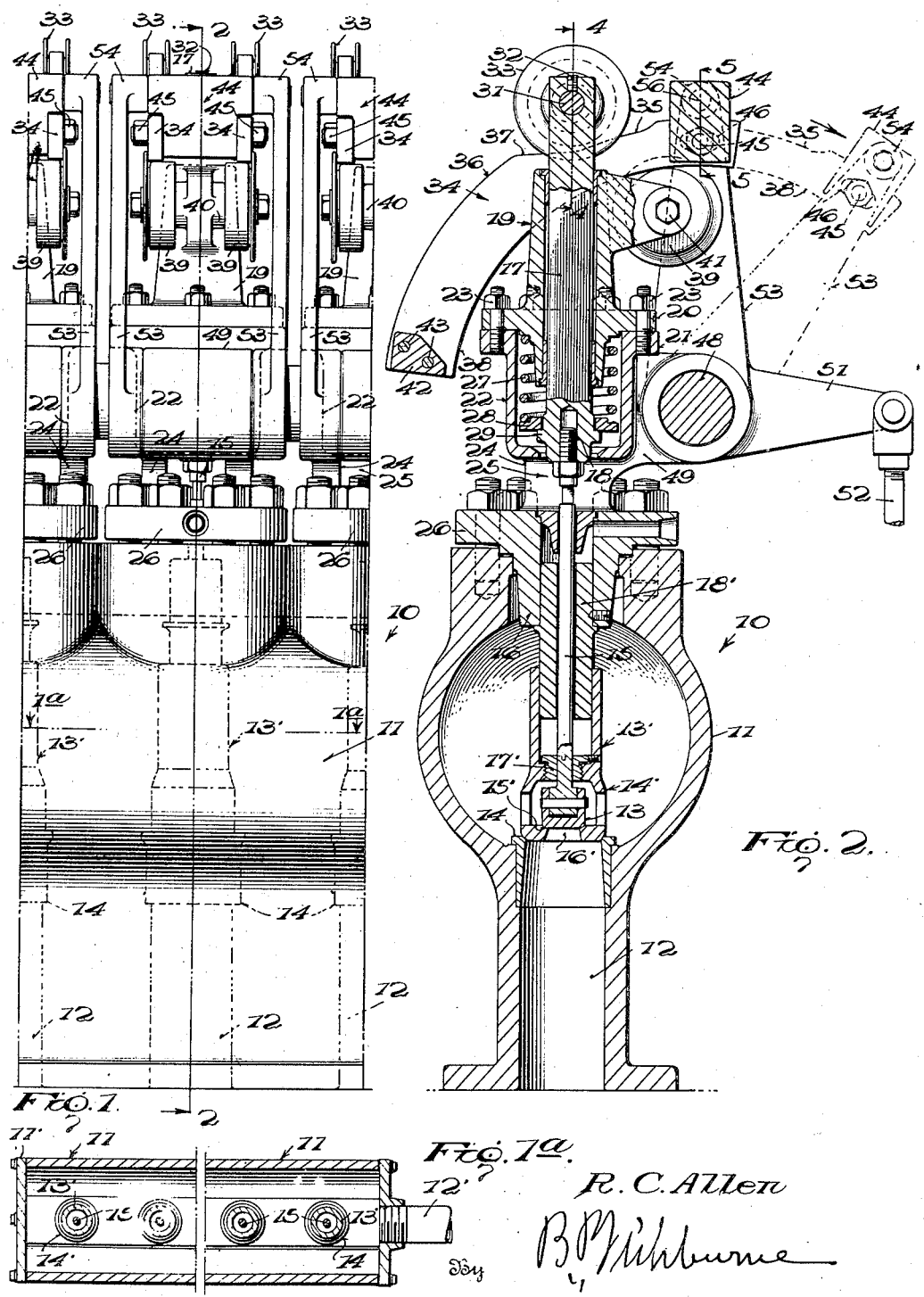

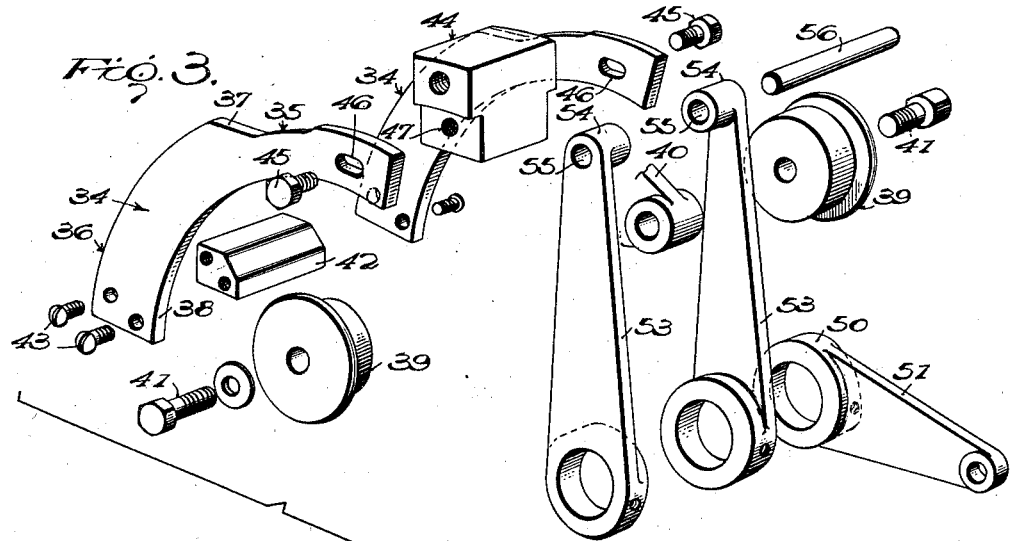
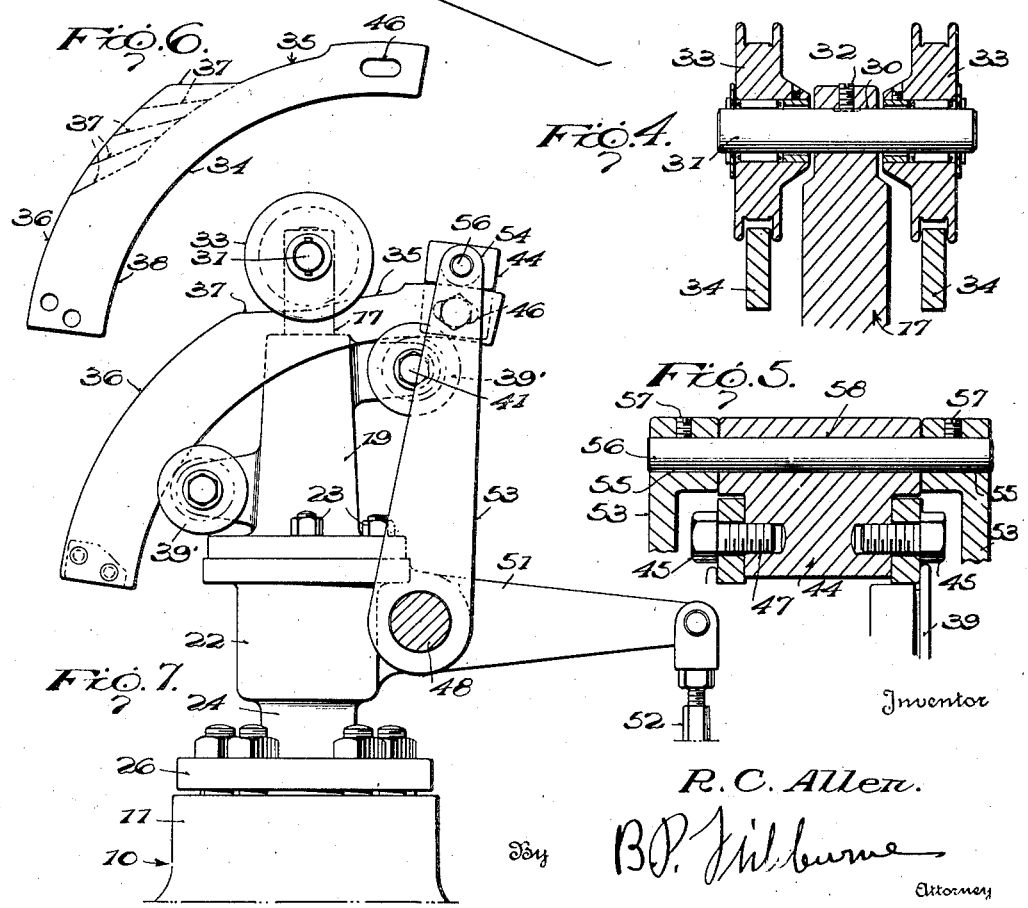

Patented Jan. 4, 1938

2,104,502

UNITED STATES PATENT OFFICE 2,104,502

VALVE

Robert C. Allen, Wauwatosa, Wis., assignor to Murray Iron Works Company, Burlington, Iowa, a corporation of Iowa Application September 24, 1936, Serial No. 102,422

9 Claims. (Cl. 137—139)

My invention relates to improvements in valves.

An important object of the invention is to provide a valve adapted for controlling the passage of steam or other fluid under pressure to a desired point, having its valve body unseated in a manner to practically eliminate side thrusts upon the operating part connected therewith.

A further object of the invention is to so construct and arrange the lifting surface of the cam that side thrusts upon the reciprocating bar which unseats the valve body is practically eliminated.

A further object of the invention is to provide operating means for a series of valves, so constructed that a plurality of cams are moved by a common actuating element, and have surfaces arranged to unseat the several valve bodies in proper succession.

A further object of the invention is to provide apparatus of the above mentioned character which is reliable in operation and may be manufactured at a relatively low cost.

Other objects and advantages of the invention will be apparent during the course of the following description.

In the accompanying drawings forming a part of this application and in which like numerals are employed to designate like parts throughout the same, Figure 1 is a side elevation of a valve embodying my invention, Figure 1a is a horizontal section through a plurality of valve casings, the same being shown diagrammatically, and indicated as taken on line 1a—1a of Figure 1, Figure 2 is a vertical longitudinal section taken on line 2—2 of Figure 1, Figure 3 is an exploded perspective view of the valve lifting rod operating mechanism, Figure 4 is a transverse section taken on line 4—4 of Figure 2, Figure 5 is a similar view taken on line 5—5 of Figure 1, Figure 6 is a side elevation of a cam bar, showing corresponding lifting surfaces for a series of valve bodies, and, Figure 7 is a side elevation of a modified form of valve.

In the drawings, wherein for the purpose of illustration is shown a preferred embodiment of my invention, the numeral 10, Figure 1, designates a plurality of valves, each of which comprises a main casing 11 having a suitable outlet 12. The casings 11 may be cast or formed in a unit and are connected in series. One end casing is closed by a plate or head 11', while the opposite end casing has connection with a pressure supply pipe 12', as more clearly shown in Figure 1a. The steam or motive fluid under pressure passing to the outlet 12 in each valve is controlled by a multiple valve body 13'. This multiple valve body comprises an outer hollow valve body 14', engaging a valve seat 14. Operating within the hollow valve body 14' is an inner valve body 13, adapted to engage a valve seat 15' formed upon the valve body 14', to cover an opening or passage 16'. The valve body 13 is rigidly secured to a rod 15, slidable through a sleeve 17' of the valve body 14'. The valve body 13, when in the lower position, to engage the seat 15', is spaced from the sleeve 17'. The rod 15 is slidably mounted within a sleeve 18', carried by a gland 16. The upper portion of the valve body 13' is slidably mounted upon the exterior of the sleeve 18'. The rod 15 is connected with a lift bar 17, as shown at 18, which connection is preferably adjustable. The lift bar 17 operates within a tubular vertical guide 19, provided at its lower end with a flange 20, rigidly secured to the flange 21 of a spring housing 22 by bolts 23, or the like. The spring housing 22 is rigidly secured to webs or legs 24, spaced for providing a passage 25, and these legs or webs are rigidly secured to the top 26 of the gland 16, as shown. A spring 27 is arranged within the housing 22 and engages a ring 28, in turn engaging a flange 29, preferably formed integral with the lower end of the lift bar 17. The function of the spring 27 is to force the lift bar 17 and rod 15 downwardly, thereby seating the valve bodies 13. However, the invention is not restricted to the use of the spring for this purpose as any other suitable means may be employed, such as a weight, or pressure operated device.

As more clearly shown in Figure 4, the upper end of the lift bar 17 is preferably flattened and has a transverse opening 30 for receiving a transverse horizontal shaft 31, clamped therein by a set screw 32, or the like. Grooved rollers or wheels 33 are rotatably mounted upon the ends of the transverse shaft 31 and are disposed upon opposite sides of the lift bar, as shown.

Engaging within the grooves of the rollers or wheels 33 are segmental cam bars 34. The cam bars in each pair have an inner circularly curved cam face 35, an outer circularly curved cam face 36, and an inner straight lifting or shifting cam face 37. The cam bars have inner circularly curved edges 38, engaging with and supported by flanged rollers or wheels 39, arranged upon the opposite sides of a bracket or web 40, and pivotally secured thereto by pivot elements or bolts 41. Disposed between the forward ends of the cam bars 38 is a spacing element or block 42, rigidly secured to the same by bolts 43. Arranged between the rear ends of the cam bars 38 is a spacing block 44, to which the ends of the cam bars are longitudinally adjustably connected by bolts 45, operating within elongated slots 46 and screw-threaded openings 47 in the spacing block. It is obvious that by manipulation of the bolts 45, the spacing bars may be longitudinally adjusted within limits, with respect to the spacing block, and locked in the selected position.

The numeral 48 designates an operating shaft, journalled in bearings formed in arms or brackets 49, rigidly secured to the spring housings 22. A sleeve 50 is provided, and this sleeve is rigidly mounted upon the operating shaft 48, at any suitable point upon the shaft, preferably near its free end and outwardly of the casings 11. The sleeve 50 has a crank 51 to turn the same and the operating shaft, and this crank has pivotal connection with a rod 52, which may be manually moved longitudinally, or shifted mechanically by a fluid actuated piston, or any other means. Rigidly connected with the shaft 48 near each casing 11 are spaced upstanding arms 53, which are provided at their free ends with inwardly projecting heads 54, having openings 55, to receive a pivot element or pin 56, held in place by set screws 57. The pin 56 is pivotally mounted within an opening 58, formed in the upper portion of the spacing block 44, as clearly shown in Figure 5.

Attention is particularly called to the fact that the segmental cam bars 34 have their lower circularly curved edges 38 concentric with the turning axis of the operating shaft 48, and the inner curved cam faces 35 concentric with such axis, and their outer cam faces 36 concentric with such axis. The intermediate straight lifting or shifting cam faces 37 are so angularly arranged with respect to the cam bars 34, that when the cam faces 37 are brought into engagement with the rollers 33, such straight cam faces are substantially horizontal or arranged at a right angle to the longitudinal axis of the reciprocatory bar 17. The straight faces 37 remain at substantially a right angle to the longitudinal axis of the bar 17, during the shifting of the bar to unseat the valve bodies and will therefore exert the minimum side thrusts upon the lift bar 17. Substantially all side thrusts are therefore taken off of the lift bar and its guide 19, during the unseating of the valve bodies.

When the shaft 48 is common to a plurality of valves 10, for unseating the valve bodies thereof, in succession, each pair of cam bars have their lifting faces 37 spaced longitudinally of the cam bars, as shown in Figure 6. When each succeeding pair of straight cam faces engages the rollers 33, such cam faces 37 are disposed at substantially a right angle to the longitudinal axis of the reciprocatory bar 17. This will cause each pair of cam bars to raise its corresponding lift bar 17 in sucession, in proper timed order and without exerting substantially any side thrusts thereon. The accuracy of the operation of the lifting bar 17 may be controlled by adjusting the connections of the cam bars with the block 44, by manipulating the bolts 45, as explained.

While I have shown two arms 53 and two cam bars 34, and associated elements, for raising each lift bar, yet the invention is not restricted to this arrangement. Satisfactory results may be obtained by employing a single arm 53, operating with a single cam bar 34.

In Figure 7, an additional pair of guide rollers or wheels 39' have been provided, with the guide rollers or wheels 39. I may use the guide rollers 39 alone, arranged at the point indicated, or the guide rollers 39' alone, arranged at the point indicated, or I may use both pairs of guide rollers. The guide means for the cam bars must permit of the circular edges 38 travelling in circular paths which are concentric with the turning axis of the operating shaft 48.

The operation of the apparatus is as follows:

With the cam bars 34 in the forward position, rollers or wheels 33 engage the inner circularly curved cam faces 35, and the outer valve body 14' engages valve seat 14 and the inner valve body 13 engages valve seat 15', the seating of these valve bodies being effected by the spring 27. When the operating shaft 48 is turned clockwise, Figure 2, the arms 53 swing rearwardly and move the cam bars 34 in the same direction. The rollers 33 now engage the straight lifting cam faces 37, and will thereby move upwardly until they engage the outer circularly curved cam faces 36. The lift bar 17 is thereby raised, which unseats the valve bodies in opposition to the spring 27 and the valve bodies will remain unseated until the cam bars 34 are moved forwardly. When the rod 15 is raised, it first elevates and unseats the inner valve body 13, thus uncovering the smaller opening 16', and the upward movement of the inner valve body 13 causes it to engage sleeve 17' so that the further upward movement of the inner valve body raises and unseats the outer valve body 14'. By having a multiple valve body and unseating the smaller valve body first, the unbalanced force which is imposed upon the operating mechanism, to unseat the valve bodies, is reduced over that required to unseat a single valve body of the size of the outer valve body. However, the invention is in no sense restricted to the use of a multiple valve body, as satisfactory results are obtainable by employing a single valve body. When the straight lifting cam faces 37 engage the rollers 33, such lifting cam faces are substantially at a right angle to the longitudinal axis of the reciprocating bar 17 and the rollers travel from the inner to the outer ends of these cam faces 37, raising the lift bar 17, and substantially eliminating any resultant side thrust upon the lift bar 17 and its guide 19. The shaft 48 is turned in an opposite direction to seat the valve bodies. When this occurs, the rollers 33 again travel upon the straight cam faces 37 until they reach the inner cam faces 35, whereby spring 27 moves the lift bar 17 downwardly, thereby seating the valve bodies.

It is to be understood that the forms of my invention herewith shown and described are to be taken as preferred examples of the same and that various changes in the size, shape and arrangement of parts may be resorted to, without departing from the spirit of my invention or the scope of the subjoined claims.

Having thus described my invention, I claim:

1. In a valve, a casing having a valve seat, a valve body to engage the valve seat, a reciprocatory bar connected with the valve body to move it, a roller attached to the reciprocatory bar, a swinging arm having its axis of turning movement arranged near the casing, a cam bar having an inner circularly curved edge which is concentric with the axis of turning movement of the arm, said cam bar being arranged to engage with the roller and having inner and outer circularly curved cam faces which are concentric with the axis of turning movement of the lever and an intermediate shifting cam face which is disposed substantially at a right angle to the longitudinal axis of the reciprocatory bar when it engages the roller to shift the same to thereby eliminate substantially all side thrusts upon the reciprocatory bar, means connecting the free end of the cam bar with the free end of the swinging arm, and supporting means engaging the inner circularly curved edge of the cam bar so that the inner circularly curved edge may travel concentrically with the turning axis of the swinging arm.

2. In a valve, a casing having a valve seat, a valve body to engage the valve seat, a reciprocatory bar connected with the valve body and carrying a shifting part, a swinging arm arranged near the casing and having a turning axis, a cam bar having a circularly curved supporting face arranged concentric with the arm turning axis and also having inner and outer cam faces which are concentric with said turning axis and an intermediate shifting cam face which is arranged substantially at a right angle with the longitudinal axis of the reciprocatory bar when brought into engagement with the shifting part of such reciprocatory bar, supporting means engaging the circularly curved supporting face of the cam bar so that such supporting face may travel concentrically with the turning axis of the swinging arm, and means connecting the cam bar and swinging arm.

3. In a valve, a valve body, a reciprocatory bar to move the valve body, a pair of rollers connected with the reciprocatory bar, a pair of cam bars having circularly curved supporting edges and concentric inner and outer cam faces and intermediate substantially straight cam faces, a pivoted support, fixedly supported guide rollers engaging the circularly curved supporting edges so that such edges may travel concentrically with respect to the turning axis of the pivoted support, a pair of arms rigidly secured to the pivoted support and connected with the cam bars, and means to move the pivoted support.

4. In a valve, a casing having a valve seat, a valve body to engage the valve seat, a reciprocatory bar connected with the valve body to move it, a roller attached to the reciprocatory bar, a swinging arm arranged near the reciprocatory bar, a pivotal support for the swinging arm, a fixedly supported roller arranged near the reciprocatory bar, a cam bar having a circularly curved supporting face operating upon the fixedly supported roller, the circularly curved supporting face being concentric with the pivotal support for the swinging arm, said cam bar also having inner and outer circularly curved cam faces which are concentric with said pivotal support and an intermediate shifting cam face which is disposed substantially at a right angle to the longitudinal axis of the reciprocatory bar when it engages the roller secured to the bar, means to pivotally connect the cam bar and the swinging arm, and means to move the swinging arm.

5. In a valve, a casing having a valve seat, a valve body to engage the valve seat, a reciprocatory bar connected with the valve body to move it, a roller attached to the reciprocatory bar, a swinging arm arranged near the reciprocatory bar, a pivotal support for the swinging arm, a cam bar having a circularly curved supporting face and also having a cam face to engage with the roller, a roller engaging the circularly curved supporting face so that the supporting face may remain concentric with said pivotal support during the movement of the cam bar, and means to pivotally connect the swinging arm and the cam bar.

6. In a valve, a casing having a valve seat, a valve body to engage the valve seat, a reciprocatory bar connected with the valve body to move it, rollers disposed upon opposite sides of the reciprocatory bar and pivotally mounted thereon, a swinging arm arranged near the reciprocatory bar, a pivotal support for the swinging arm, cam bars disposed upon opposite sides of the reciprocatory bar and having cam faces to engage the rollers, said cam bars also having circularly curved supporting faces which are concentric with said pivotal support, rollers engaging the circularly curved supporting faces for supporting the cam bars, and means connecting the cam bars and the swinging arm, the swinging arm serving to exert a pulling action upon the cam bars in a circular path concentric with said pivotal support.

7. In a valve, a casing having a valve seat, a valve body to engage the valve seat, a reciprocatory bar connected with the valve body to move it, a roller connected with the bar, fixed supporting means arranged near the bar, a cam bar having a circularly curved supporting face to engage the fixed supporting means so that the cam bar will travel in a circular path, said cam bar having a cam face to engage the roller, and means to exert a longitudinal pulling action upon the cam bar in the circular path of travel of the cam bar.

8. In a valve, a casing having a valve seat, a valve body to engage the valve seat, means to unseat the valve body, a fixed supporting means arranged near the unseating means, a cam bar having a circularly curved supporting face to engage the fixed supporting means so that the cam bar will travel in a circular path, said cam bar having a cam face to engage the unseating means, and means to exert a longitudinal pulling action upon the cam bar in the circular path of travel of the cam bar.

9. In a valve, a casing having a valve seat, a valve body to engage the valve seat, means to unseat the valve body, a fixed supporting means arranged near the unseating means, a cam bar having a circularly curved supporting face to engage the fixed supporting means so that the cam bar will travel in a circular path, said cam bar having a cam face to engage with the unseating means and so angularly disposed with respect to the cam bar that such cam face is arranged at substantially a right angle to the longitudinal axis of the unseating means when engaging therewith, and means to exert a longitudinal pulling action upon the cam bar in the circular path of travel of the cam bar.

ROBERT C. ALLEN.